United States Patent
Jennas, II et al.

(10) Patent No.: US 9,116,853 B1
(45) Date of Patent: Aug. 25, 2015

(54) TAPE BACKUP AND RESTORE IN A DISK STORAGE ENVIRONMENT

(71) Applicant: International Business Machines Corporation, Armonk, NY (US)

(72) Inventors: Paul A. Jennas, II, Tucson, AZ (US); Jason L. Peipelman, Vail, AZ (US); Chris Zukowski, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/463,705

(22) Filed: Aug. 20, 2014

(51) Int. Cl.
*G11B 27/02* (2006.01)
*G06F 11/14* (2006.01)

(52) U.S. Cl.
CPC ........ *G06F 11/1469* (2013.01); *G06F 11/1456* (2013.01); *G06F 11/1458* (2013.01); *G06F 11/1466* (2013.01); *G06F 11/1471* (2013.01); *G06F 11/1451* (2013.01)

(58) Field of Classification Search
CPC .............. G06F 3/0608; G06F 11/1469; G06F 11/1471; G06F 11/1466; G06F 11/1458; G06F 1/1456; G06F 11/1451; G06F 11/2097; G06F 11/2094; G11B 2220/90; G11B 27/032; G11B 27/024
USPC ............ 360/13; 711/162, 114, 156, 170, 163, 711/112, 111, 202; 713/324, 300, 320; 707/999.202, 102, 640, 642
See application file for complete search history.

(56) References Cited

U.S. PATENT DOCUMENTS

| | | | |
|---|---|---|---|
| 6,353,878 B1 | 3/2002 | Dunham | |
| 6,366,987 B1 | 4/2002 | Tzelnic et al. | |
| 7,529,966 B2 | 5/2009 | Cochran et al. | |
| 7,584,337 B2 | 9/2009 | Rowan et al. | |
| 7,831,561 B2 | 11/2010 | Wertheimer et al. | |
| 7,865,471 B1 | 1/2011 | Stagg | |
| 7,870,409 B2 * | 1/2011 | Murase | 713/324 |
| 8,065,271 B2 | 11/2011 | Mizuno | |
| 8,335,770 B2 | 12/2012 | Merchant et al. | |
| 8,386,430 B1 | 2/2013 | Myhill et al. | |
| 8,386,733 B1 | 2/2013 | Tsaur et al. | |
| 8,601,209 B1 | 12/2013 | LeCrone et al. | |

OTHER PUBLICATIONS

Jennas II. et al., "Tape Backup and Restore in a Disk Storage Environment," U.S. Appl. No. 14/541,689, filed Nov. 14, 2014.
IBM, "List of IBM Patents or Patent Applications Treated as Related."

* cited by examiner

*Primary Examiner* — Ali Neyzari
(74) *Attorney, Agent, or Firm* — Scott S. Dobson; Jennifer M. Anda

(57) ABSTRACT

A command to write data to a disk location is received at a disk storage system. The data is written to the disk location and a record including the data, the disk location, and a sequence value is generated. The first sequence value indicates relative sequence when compared to other sequence values. The record is written to a record location on a tape cartridge loaded in a tape drive. Record metadata on the disk storage system is modified to indicate that the record location contains current data. Tape cartridges containing records may be used to restore data to disk storage.

16 Claims, 7 Drawing Sheets

| Track ID | Tape Cartridge | Cartridge Address |
|---|---|---|
| A | AAA001 | 0x375 |
| B | AAA001 | 0x1A6 |
| C | 0 | 0 |
| D | AAA001 | 0x51E |
| E | AAA038 | 0x008 |
| ... | ... | ... |

700

| Track ID | Tape Cartridge | Cartridge Address | Sequence # |
|---|---|---|---|
| fb_0001 A | AAA001 | 0x375 | 4225 |
| fb_0001 B | AAA001 | 0x1A6 | 1245 |
| fb_0001 C | AAA038 | 0x1A6 | 1246 |
| fb_0001 D | AAA001 | 0x51E | 189 |
| fb_0001 E | AAA038 | 0x008 | 3945 |
| ... | ... | ... | |

FIG. 7

TAPE BACKUP AND RESTORE IN A DISK STORAGE ENVIRONMENT

BACKGROUND

The present disclosure relates to computer backup storage, and more specifically, to log-structured tape backup and restore in a disk storage environment.

Tape storage is sometimes used to backup data from disk storage. Tape storage provides backup storage at a low energy cost and allows data to survive for a long period of time in an encrypted format. Users backing up disk storage to tape storage typically build a custom-offload solution that involves creating a point in time copy of the volumes to be backed up, then, using a tape manager and/or host application, copying the data from the point in time copy to the tape. This is normally done at night, and care must be taken to ensure off-load is done within a certain period of time.

SUMMARY

According to embodiments of the present disclosure, a method for tape backup in a disk storage environment is disclosed. The method includes receiving, at a disk storage system, a command to write data to a first disk location on the disk storage system. The method further includes writing the data to the first disk location on the disk storage system. The method further includes generating a first record including the data, the first disk location, and a first sequence value. The first sequence value indicates relative sequence when compared to other sequence values. The method further includes writing the first record to a first record location on a first tape cartridge loaded in a tape drive. The method further includes modifying record metadata on the disk storage system to indicate that the first record location contains current data.

Further disclosed herein are embodiments of a system. The system includes a tape backup system including a plurality of tape cartridges. The system further includes a disk storage system connected to the tape backup system. The disk storage system is configured to receive a command to write data to a first disk location on the disk storage system. The disk storage system is further configured to write the data to the first disk location on the disk storage system. The disk storage system is further configured to generate a first record including the data, the first disk location, and a first sequence value. The first sequence value indicates relative sequence when compared to other sequence values. The disk storage system is further configured to write the first record to a first record location on a first tape cartridge loaded in a tape drive. The disk storage system is further configured to modify record metadata on the disk storage system to indicate that the first record location contains current data.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7 depicts an example record restore table.

Figure 1:
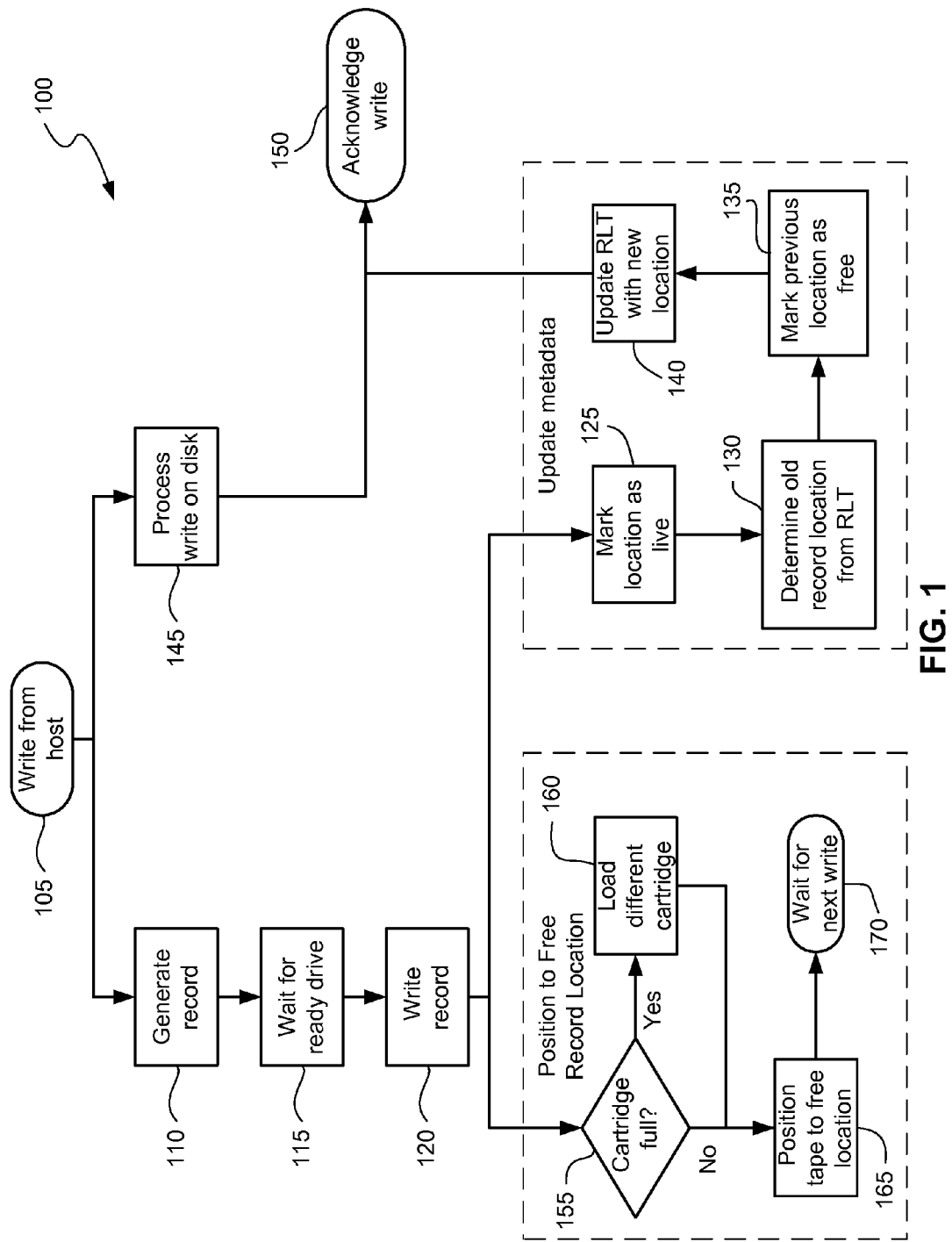
FIG. 1 depicts an example method for log-structured, synchronous tape backup in a disk storage environment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to log-structured tape backup and restore in a disk storage environment, and more particular aspects relate to synchronous log-structured tape backup. While the present disclosure is not necessarily limited to such applications, various aspects of the disclosure may be appreciated through a discussion of various examples using this context.

Embodiments of the present disclosure may provide for continuously and synchronously mirroring the data written to a disk storage system to a tape storage system in a way which may reduce tape seek times by sequentially writing the data without needing to index the data at specific locations on the tape cartridges. Further embodiments of the present disclosure may provide for restoring data to the disk storage system from the tape storage system.

When a write command is received at a disk storage system, the disk storage system may write a record containing the data, disk location information and a sequence value to a tape drive loaded with a tape cartridge while synchronously writing the data to disk. The disk location information and sequence value may be located in a header to simplify identification during restore from tape backup. The disk location information may represent a physical disk location or a logical location. The sequence values for the records may indicate the sequence of the records when compared to each other. For example, the sequence value may be a number which increases sequentially for each record written to tape. Thus, a record with a higher sequence number may indicate a more recent record than a record with a lower sequence number.

The tape storage system may maintain metadata on the records. The metadata may include a bitmap for each tape cartridge indicating record locations which contain current data and record locations which are free (i.e. which contain a current record and which contain an old record or no data). The metadata may further include a record location table with the record locations of current records for each disk location.

After writing the record to tape storage, the disk storage system may mark the location of the record as containing current data in the record metadata. Additionally, the disk storage system may reference the metadata to identify the record location for a previous record associated with the same disk location. The disk storage system may mark this record location as free and update the metadata to indicate the record location of the new record for the disk location.

Additionally, after writing the record to tape storage, the tape cartridge may be positioned at the next free record location. The next free record location may be determined by referencing the metadata. If the tape cartridge is full, a different tape cartridge may be loaded into the tape drive and may be positioned at the next free record location. The record metadata may be referenced to identify a tape cartridge with the most free record locations in determining which tape cartridge to load into the tape drive.

Data may be restored from the tape storage using information stored on the tape storage. The tape cartridges may be scanned and disk locations and sequence numbers for each record may be read. This information may be located in a header for each record. A record restore table may be generated and populated with information read from the tape cartridges. The record restore table may include a disk location, the record location, and a sequence value. For each record, the record restore table may be populated for the disk location if there is no previous record for the disk location. If the record restore table is already populated for a given disk location, the table may be updated to reference the new record, including the record location and sequence number, if the sequence number for the record indicates a more recent record when compared to the sequence number in the table. If the sequence value indicates an older record, the record may be ignored. This process may continue until all of the records are scanned through.

The completed record restore table may indicate the most current record location for each disk location. This information may be used to restore data from the tape cartridges to their respective disk locations. In some embodiments, a user may be presented with a list of disk locations or volumes which are available to be restored. The user may make a selection from the list and the selection may be restored from the tape cartridges using the record restore table.

Referring to FIG. 1, an example method 100 for log-structured, synchronous tape backup in a disk storage environment is depicted. At block 105, a write command may be received at a disk storage system. In response to receiving the write command, at block 145, the write command may be processed and the data written to a first disk location. Additionally, in response to receiving the write command, at block 110, a record may be generated containing the first disk location, the data, and a sequence value. At block 115, method 100 may wait for a ready tape drive which is loaded with a tape cartridge and positioned at a free record location. At block 120, the record may be written to the free record location on the tape cartridge. In response to writing the record, method 100 may proceed to update metadata associated with the records and position a tape cartridge in the tape drive to a free record location.

At block 125, the location of the record may be marked as containing current data in the record metadata. This may include modifying a cartridge record bitmap associated with the record location. At block 130, a record location for the previous record containing backup data for the first disk location may be determined. This may be determined by referencing a record location table. At block 135, the record location for the previous record may be marked free in the record metadata. At block 140, the record location table may be updated to include the new record location for the record associated with the first disk location. Once the write has been processed on disk and the metadata has been updated, method 100 may proceed to block 150 and acknowledge the write to the host.

At block 155, it may be determined whether the tape cartridge is full. This may be determined by referencing metadata associated with the tape cartridge, such as a cartridge record bitmap, to determine if there are more free record locations on the cartridge. If the tape cartridge is not full, method 100 may proceed to block 165. If the tape cartridge is full, method 100 may proceed to block 160, remove the tape cartridge and load a different cartridge into the tape drive before proceeding to block 165. The cartridge loaded may be the cartridge with the most free record locations as determined through metadata, such as cartridge record bitmaps. At block 165, the loaded tape cartridge is positioned at a free record location. At block 170, the tape drive waits to write the next record.

Figure 2:
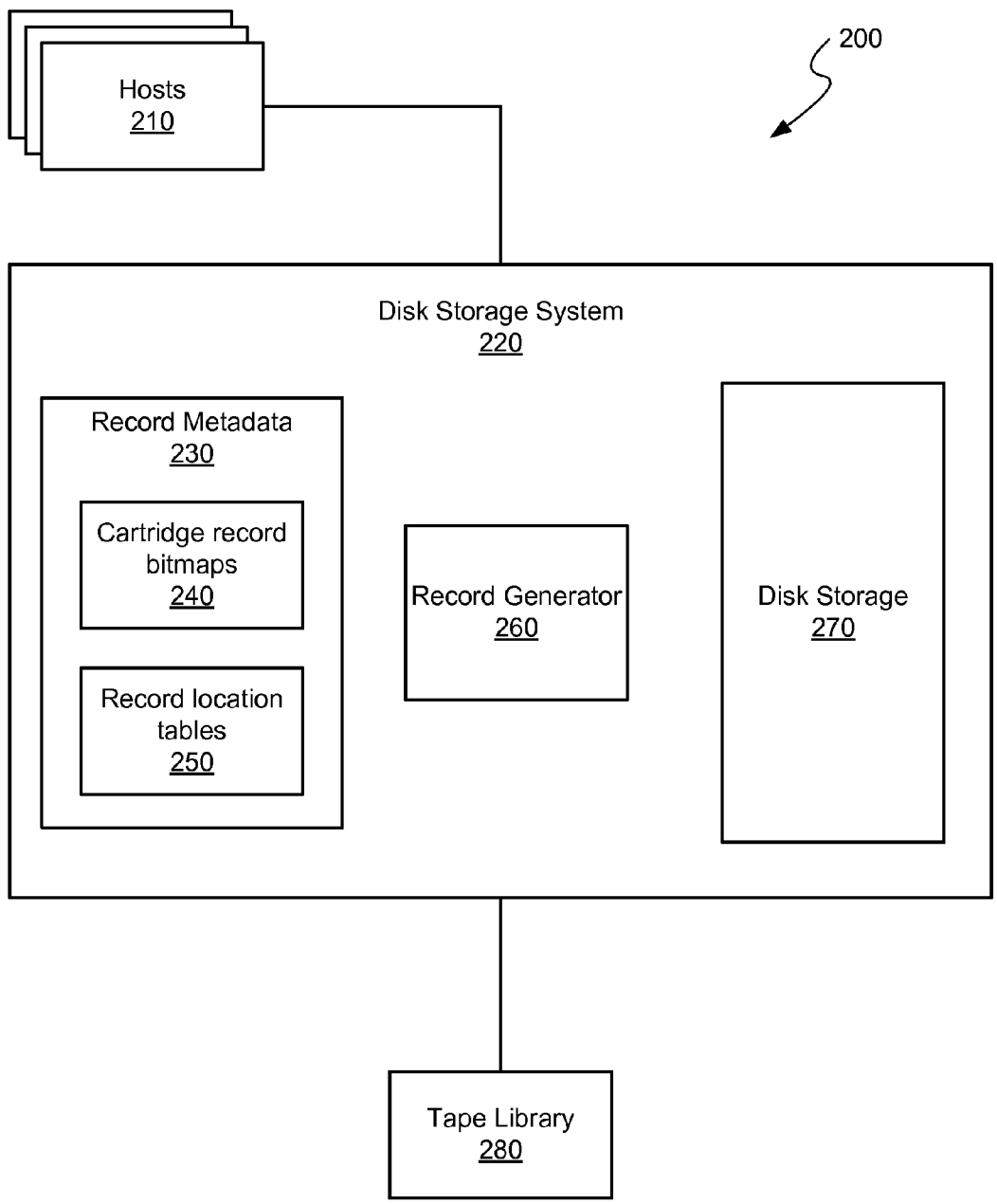
FIG. 2 depicts a block diagram of an example system for log-structured tape backup in a disk storage environment.

Referring to FIG. 2, a block diagram of an example system 200 for log-structured tape backup in a disk storage environment is depicted. System 200 may include one or more hosts 210, disk storage system 220, and tape library 280. The one or more hosts 210 may send write commands to disk storage system 220. Disk storage system 220 may contain disk storage 270 on which the write commands are processed. Disk storage system 220 may further contain record generator 260 and record metadata 230. For each write of data to disk storage 270, record generator 260 may generate a record containing the data, the location of the data in disk storage 270, and a sequence value.

Record metadata 230 may include cartridge record bitmaps 240 and record location tables 250. Record bitmaps 240 may include a bitmap for each tape cartridge in tape library 280 that indicates free record locations and record locations with current data on the respective tape cartridge. Record bitmaps 240 may be updated after each record is written to a tape cartridge, including marking the new location as containing current data and the old location as free. Record location tables 250 may contain the current record location corresponding to each disk location on disk storage 270. The information may be used to identify the location of an old record for marking in record bitmaps 240 and may be updated following the write of a new record to a tape cartridge. Tape library 280 may contain one or more tape drives and one or more tape cartridges for writing records.

To initially configure a system 200 as described herein, a user may physically connect I/O ports on tape library 280 to the host adaptor I/O ports on disk storage system 220. This may be done through a switch as well. The user may configure the connection statistics for tape library 280 so that data communication can occur between disk storage system 220 and tape library 280. The user may select tape cartridges that may be used for backup purposes. The user may identify which disk locations on disk storage 270 will be sequentially mirrored to tape library 280. The user may identify a set of tape drives to be used to write to the tape cartridges.

Cartridge record bitmaps 240 may be configured by disk storage system 220 in response to the user identifying the pool of cartridges. Record location tables 250 may be configured by disk storage system 220 in response to the user identifying the disk locations to be sequentially mirrored.

Due to the way in which the record writes are done sequentially to the tape cartridges, the synchronous mirroring may proceed faster with a larger capacity in the cartridge pool. Next free record locations may be more quickly identified and more quickly available for writing a record when there is larger cartridge capacity. The cartridge capacity may be much greater than the capacity of the disk locations being backed up.

Figure 3:
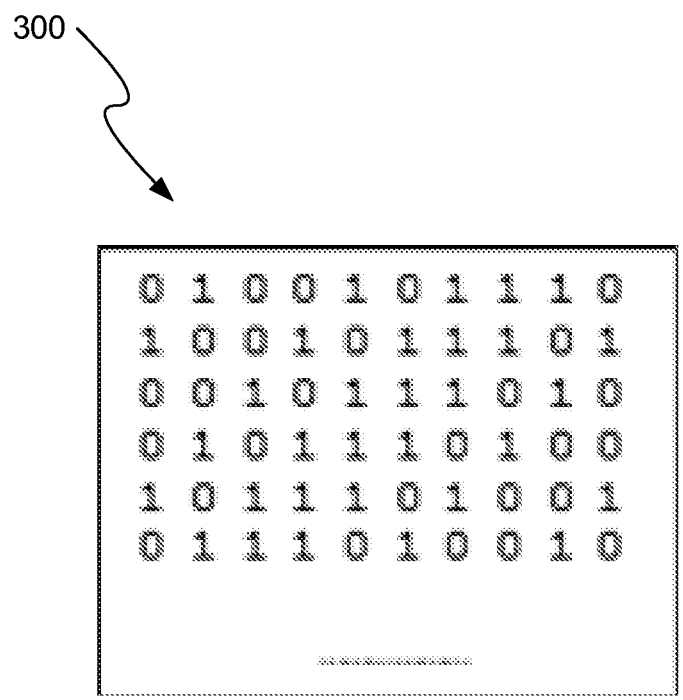
FIG. 3 depicts an example bitmap for recording the status of record locations on a tape cartridge.

Referring to FIG. 3, an example bitmap 300 for recording the status of record locations on a tape cartridge is depicted. Each 0 and 1 may represent a specific uniformly sized record location on the respective tape cartridge. The 0 and 1 may indicate if the location contains current data or if the location is free. For example, the free locations may be represented by a 0 and the current data locations may be represented by a 1. By default all locations on a new tape cartridge may be marked as free.

Figure 4:
FIG. 4 depicts an example record location table for a disk storage volume.

Referring to FIG. 4, an example record location table 400 for a disk storage volume is depicted. The table indicates the location of the record associated with each disk location ("track ID") on the disk storage volume. The record location includes an identifier for the tape cartridge and the cartridge address of the record on the tape cartridge. As depicted, there are no address values for track ID "C" in table 400. This may indicate that no record has been written yet for track ID "C."

Figure 5:
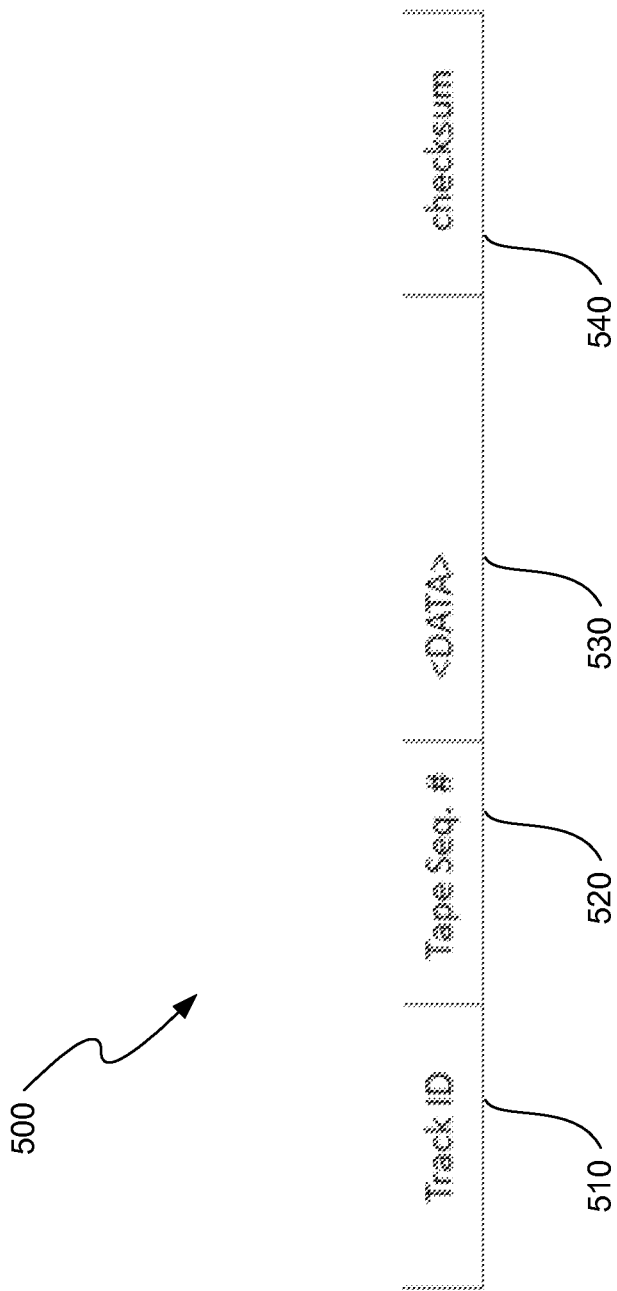
FIG. 5 depicts an example record for writing to tape storage.

Referring to FIG. 5, an example record 500 for writing to tape storage is depicted. Record 500 may include a track ID 510, sequence value 520, and data 530. Record 500 may additionally contain a checksum 540 or other validating value for detecting data corruption. Track ID 510 may contain information indicating the disk location of data 530 such as disk volume and location within the volume. Record 500 may also contain any additional information for identifying the disk location of data 530. Sequence value 520 may indicate the relative sequence of records when compared to the sequence value of other records. Track ID 510, and sequence value 520 may be located in a header of record 500. Locating the information in a header may allow for a simpler retrieval of information during the disk restore process.

Figure 6:
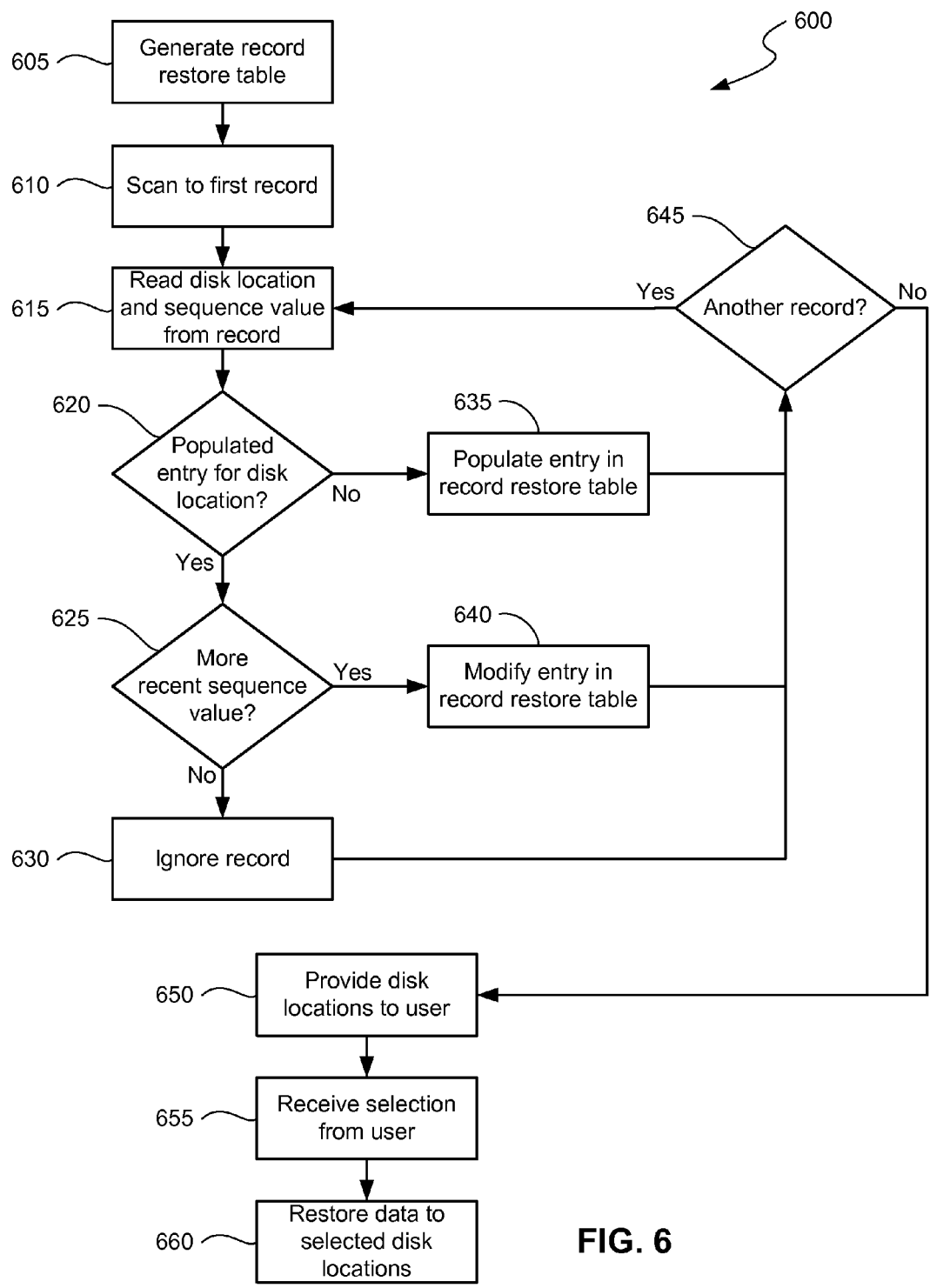
FIG. 6 depicts an example method for restoring data to disk storage from tape backup.

Referring to FIG. 6, an example method 600 for restoring data disk storage from tape backup is depicted. At block 605, a record restore table may be generated. This may be done in response to a user identifying the tape cartridges which are part of the backup cartridge pool for restoring the disk storage. At block 610, a first record may be identified by scanning through tape cartridges. At block 615, the disk location and sequence value may be read from the record. These may be read from the header of the record. At block 620, it is determined whether there is a populated entry for the disk location read off the record. If there is not a populated entry, method 600 may proceed to block 635 and populate an entry in the record restore table. The entry in the record restore table may include the disk location, record location of the record, and the sequence value. If, at block 620, there is a populated entry for the disk location, method 600 may proceed to block 625.

At block 625, the sequence value from the populated entry may be compared to the sequence value from the record. If the sequence value from the record indicates a more recent record, method 600 may proceed to block 640 and modify the entry in the record restore table to include the record location of the record and sequence value from the record. If, at block 625, the sequence value from the record indicates an older record, method 600 may proceed to block 630 and ignore the record. From blocks 630, 635, and 640, method 600 may proceed to block 645 and scan for another record. If there is another record, method 600 may return to block 615. If there is not another record, method 600 may proceed to block 650 and provide a list of volumes that may be restored to a user. At block 655, a selection of volumes to restore may be received from the user. At block 660, the selected volumes are restored to disk using the locations identified in the record restore table to read the data from the tape cartridges and write them to the correct disk location.

Referring to FIG. 7, an example record restore table 700 is depicted. As shown, each entry may include a disk location (i.e. track ID), record location (tape cartridge and cartridge address), and a sequence number. Table 700 may be populated as described above. For example, a header may be read from a record which contains track ID fb_0001 F. Table 700 does not have an entry for the track ID so, in this example, another row may be populated for the new track ID. In another example, a header may be read from a record with a track ID fb_001D. Table 700 already has an entry for that track ID so the sequence number may determine if the information in the table is updated. In this example, if the sequence number in the header for the record is greater than 189, the tape cartridge, cartridge address and sequence number may be updated for track ID fb_0001 D in table 700.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for tape backup in a disk storage environment, the method comprising:
   receiving, at a disk storage system, a command to write data to a first disk location on the disk storage system;
   writing the data to the first disk location on the disk storage system;
   generating a first record comprising the data, the first disk location, and a first sequence value, the first sequence value indicating relative sequence when compared to other sequence values;
   writing the first record to a first record location on a first tape cartridge loaded in a tape drive; and
   modifying record metadata on the disk storage system to indicate that the first record location contains current data.

2. The method of claim 1, further comprising:
   identifying, from the record metadata, a second record location containing a previous record associated with the first disk location; and
   modifying the record metadata to indicate that the second record location is free.

3. The method of claim 1, further comprising:
   identifying a next free record location on the first tape cartridge using the record metadata; and
   positioning the first tape cartridge at the next free record location.

4. The method of claim 1, further comprising:
   determining the first tape cartridge is full after the writing the first record;
   removing the first tape cartridge from the tape drive;
   loading a second tape cartridge into the tape drive;
   determining a next free record location on the second tape cartridge using the record metadata; and
   positioning the second tape cartridge at the next free record location.

5. The method of claim 4, further comprising:
   identifying the second tape cartridge as having a most free record locations out of a set of tape cartridges.

6. The method of claim 1, wherein the record metadata comprises a bitmap that indicates record locations that contain current data.

7. The method of claim 2, wherein the record metadata comprises a record location table, the method further comprising:
   updating an entry in the record location table associated with the first disk location to reference the first record location.

8. A system comprising:
   a tape backup system comprising a plurality of tape cartridges; and
   a disk storage system connected to the tape backup system, the disk storage system configured to:
   receive a command to write data to a first disk location on the disk storage system;

write the data to the first disk location on the disk storage system;
generate a first record comprising the data, the first disk location, and a first sequence value, the first sequence value indicating relative sequence when compared to other sequence values;
write the first record to a first record location on a first tape cartridge loaded in a tape drive; and
modify record metadata on the disk storage system to indicate that the first record location contains current data.

9. The system of claim 8, wherein the disk storage system is further configured to:
identify, from the record metadata, a second record location containing a previous record associated with the first disk location; and
modify the record metadata to indicate that the second record location is free.

10. The system of claim 8, wherein the disk storage system is further configured to:
identify a next free record location on the first tape cartridge using the record metadata; and
position the first tape cartridge at the next free record location.

11. The system of claim 8, wherein the disk storage system is further configured to:
determine the first tape cartridge is full after the write of the first record;
remove the first tape cartridge from the tape drive;
load a second tape cartridge into the tape drive;
determine a next free record location on the second tape cartridge using the record metadata; and
position the second tape cartridge at the next free record location.

12. The system of claim 11, wherein the disk storage system is further configured to:
the second tape cartridge as having a most free record locations out of a set of tape cartridges.

13. The system of claim 8, wherein the record metadata comprises a bitmap that indicates record locations that contain current data.

14. The system of claim 9, wherein the record metadata comprises a record location table, and wherein the disk storage system is further configured to:
update an entry in the record location table associated with the first disk location to include the first record location.

15. The system of claim 8, wherein the disk storage system is further configured to:
generate a record restore table;
scan the plurality of tape cartridges;
read a third disk location and third sequence value from a third record at a third record location; and
populate a first entry in the record restore table, the first entry comprising the third disk location, the third record location, and the third sequence value.

16. The system of claim 15, wherein the disk storage system is further configured to:
read a fourth disk location and fourth sequence value from a fourth record at a fourth record location;
determine the fourth disk location matches the third disk location in the first entry;
determine the fourth sequence value is more recent than the third sequence value; and modify the first entry to include the fourth record location and the fourth sequence value.

* * * * *